(12) United States Patent
Makino

(10) Patent No.: US 6,507,426 B2
(45) Date of Patent: Jan. 14, 2003

(54) SCANNER APPARATUS

(75) Inventor: Kazuhiro Makino, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/025,820

(22) Filed: Dec. 26, 2001

(65) Prior Publication Data

US 2002/0085261 A1 Jul. 4, 2002

(30) Foreign Application Priority Data

Dec. 25, 2000 (JP) ........................................ 2000/393231

(51) Int. Cl.[7] .............................................. G02B 26/08
(52) U.S. Cl. ........................ 359/196; 359/393; 359/896; 250/206.1
(58) Field of Search ................................. 359/196–226, 359/896, 391–393; 250/559.29, 206.1, 206.2, 227.26, 234–236; 348/297, 300, 301

(56) References Cited

U.S. PATENT DOCUMENTS 4,258,264 A 3/1981 Kotera et al.
4,956,716 A * 9/1990 Hewitt et al. ............... 348/301

FOREIGN PATENT DOCUMENTS

JP 55-12429 9/1981

* cited by examiner

Primary Examiner—James Phan
(74) Attorney, Agent, or Firm—Sughrue Mion, PLLC

(57) ABSTRACT

The invention discloses a scanner apparatus for performing bidirectional scanning by using an integration amplifying detector, which is capable of preventing the occurrence of jitters. To detect the n-th pixel from the left in a going direction, an integration timing setting circuit generates pulses indicating a resetting period Tr and a measuring period Ti by using the n-th pulse of a scanning position detecting clock as a reference, and then controls an integration circuit. To detect the n-th pixel from the left in a returning direction, an integration timing setting circuit generates a timing clock by delaying a difference period Td generated between the going and returning ways, with the n+1st pulse of the scanning position detecting clock from the left used as a reference, and then controls the integration circuit.

6 Claims, 3 Drawing Sheets

SCANNER APPARATUS

BACKGROUND OF THE INVENTION

1. Field of the Invention

The present invention relates to a scanner apparatus, more particularly to a scanner apparatus using an integration amplifying detector as a detector.

2. Description of the Related Art

As a means for detecting light of low luminance with high sensitivity, a means using an integration amplifier has been available. This integration amplifying detection means is designed to accumulate output charges by the integration amplifier, which have been subjected to photoelectric conversion by a photomultiplier tube (PMT) or a photodiode, convert the charges into voltages and then read them out.

Conventionally, such an integration amplifying detector has mainly been used for performing one-point observation in a time-sequential manner. In recent years, however, in order to observe a sheet-form object to be measured, which emits weak light, an application of the integration amplifying detector to a scanner for performing two-dimensional scanning has been tried.

The scanner using the integration amplifying detector generates a scanning position detecting clock indicating a period of information acquisition according to a scanning speed during main scanning, generates a timing pulse by using the scanning position detecting clock as a reference, and then indicates, to the integration amplifying detector, a period for executing integration, i.e., a measuring period, or a resetting period for releasing charges accumulated in the integration amplifying detector by this timing pulse.

The use of the scanner employing such an integration amplifying detector is advantageous, for example, for detection of photostimulating light in a radiation image recording/reproducing system (Japanese Unexamined Patent Publication No. 55 (1980)-12429 or the like) presented by an applicant of the present invention. This system uses an stimulable phosphor (photostimulable phosphor), which accumulates a part of radiation energy when irradiated with radioactive rays (X rays, α rays, β rays, γ rays, electron beams, ultraviolet rays or the like), and then shows phosphorescence according to the accumulated energy when irradiated with excitation light such as visible light. By using the stimulable phosphor, the system temporarily photographs and records the radiation image of an object, e.g., a human body, in the sheet-form stimulable phosphor, generates phosphorescent light by scanning the stimulable phosphor sheet with excitation light such as a laser beam, obtains an image signal by photoelectrically reading the generated phosphorescent light, and displays the radiation image of the object on a CRT based on the image signal by using an image recording/reproducing device or outputs the radiation image as a visible image on a photosensitive film.

In addition, to increase the readout speed (throughput) of the scanner apparatus using the above-described integration amplifying detector, bidirectional scanning should be desirably performed, which enables information to be detected in both going and returning ways, when a detection unit is scanned in a main scanning direction.

However, when bidirectional scanning is carried out by the scanner using the integration amplifying detector of the foregoing principle, a difference is generated in the integration starting time of the integration amplifying detector for obtaining information regarding each pixel between the going and returning ways of the scanner, causing a pixel positional deviation in the scanning direction between the going and returning ways. Consequently, jitters occur in the main scanning direction.

SUMMARY OF THE INVENTION

The present invention was made with the foregoing problems in mind, and it is an object of the invention to provide a scanner apparatus for performing bidirectional scanning by using integration amplifying detector, which is capable of eliminating jitters like those described above.

In accordance with the invention, a scanner apparatus having a bidirectional scanning function capable of scanning in both going and returning ways is provided. This scanner apparatus comprises: an integration amplifying detector for accumulating a detected quantity of light in a measuring period Ti within one cycle Tp, and releasing an accumulated quantity of light in a resetting period Tr; a scanning position detecting clock generator for generating a scanning position detecting clock of an interval equal to the cycle Tp for obtaining information by the integration amplifying detector; a timing pulse generator for deciding a resetting period Tr and a measuring period Ti of the integration amplifying detector based on the scanning position detecting clock, and generating timing pulses indicating the resetting period Tr and the measuring period Ti; and an A/D converter for converting a value of the quantity of light accumulated in the integration amplifying detector into a digital value. In this case, the timing pulse generator generates, in the returning way, the timing pulses by delaying a difference period Td generated between the going and returning ways.

In the scanner apparatus of the invention, the bidirectional scanning function capable of scanning in both going and returning ways is not limited to one where an object to be scanned is mechanically reciprocated, but includes one where a scanning optical system is reciprocated with respect to a fixed object to be scanned.

According to the scanner apparatus of the invention, the scanning position detecting clock generator may change the cycle Tp of the scanning position detecting clock according to a measuring condition.

The measuring condition means one for a resolution priority mode designed to enhance resolution by reducing sensitivity, or for a sensitivity priority mode designed to enhance sensitivity by reducing resolution.

According to the scanner apparatus of the invention, the timing pulse generator may generate the timing pulses to set a positive value for the difference period Td, detect the scanning position detecting clock with detection accuracy variance of 1% or lower, or generate the timing pulses to set a measuring period Ti longer by four times or more than a resetting period Tr. Moreover, when no scanning position detecting clock is detected in a cycle longer by 1.5 times than the cycle Tp for obtaining the information, the timing pulse generator may generate a timing pulse indicating a resetting period Tr.

Now, a method for calculating the difference period Td will be described by referring to FIG. 2 showing a time relation between a scanning position detecting clock and a timing pulse.

In the drawing, a scanning direction 1 indicates the going way of a main scanning direction; a scanning direction 2 the returning way of the main scanning direction; Tp the cycle of the scanning position detecting clock; Tw the pulse width of the scanning position detecting clock; Tr the resetting period of the integrator of the integration amplifying detector; Ti the integrating period of the integration amplifying detector; and Td a difference period between the going and returning ways when the information of the same place is obtained in the main scanning direction.

The cycles Tp and the pulse widths Tw of the scanning position detecting clock are equal between the going and returning ways, and pulse generation positions are identical with respect to the position of main scanning.

In the scanning direction 1, i.e., the going way of the detection unit, to detect an n-th pixel from the left, the timing pulse generator generates a pulse indicating resetting for the period Tr from the rising edge by using the rising edge of an n-th pulse of the scanning position detecting clock as a reference, and a pulse indicating measuring for the period Ti after the passage of time Tr from the rising edge.

In the scanning direction 2, i.e., in the returning way of the detection unit, to detect a position substantially identical to an n-th place detected in the going way in the main scanning direction, the timing pulse generator generates a pulse indicating resetting for the period Tr from the rising edge by using the rising edge of the n+1st pulse from the left of the scanning position detecting clock as a reference, and a pulse indicating measuring for the period Ti after the passage of time Tr from the rising edge.

In this case, if the center of the measuring period Ti is set as a measuring position, then the center position of the measuring period Ti is shifted by the difference period Td between the going and returning ways.

The difference period Td is calculated by an equation (1) below. Since a difference is within one pixel, it is impossible to make corrections by moving positions left and right by pixel units for every main scanning line after the detection of information, causing jitters in this difference period Td.

$$Td=Tp\times Tw-(2\times Tr+Ti) \qquad (1)$$

Thus, in the returning way, a timing pulse is generated by delaying an amount equal to the difference period Td, thus preventing the center shifting of the measuring period Ti between the going and returning ways.

With the scanner apparatus of the invention constructed in the foregoing manner, by changing the measuring timing of the integration amplifying detector between the going and returning ways, the center of the measuring period Ti can be prevented from being shifted for every main scanning line. As a result, it is possible to prevent the occurrence of jitters.

DESCRIPTION OF THE PREFERRED EMBODIMENT

Figure 1:
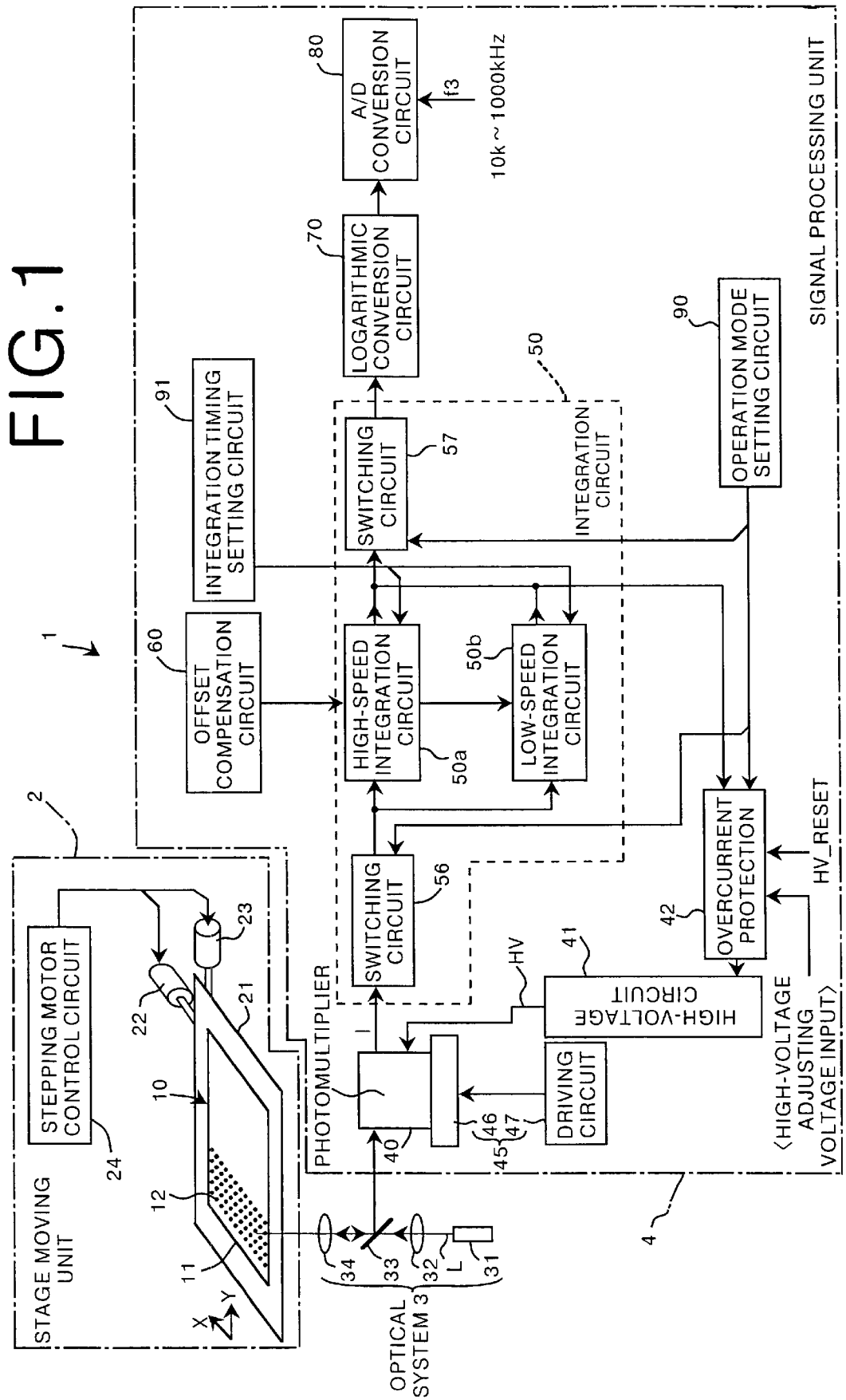
FIG. 1 is a block diagram showing a scanner apparatus of the present invention.
Figure 2:
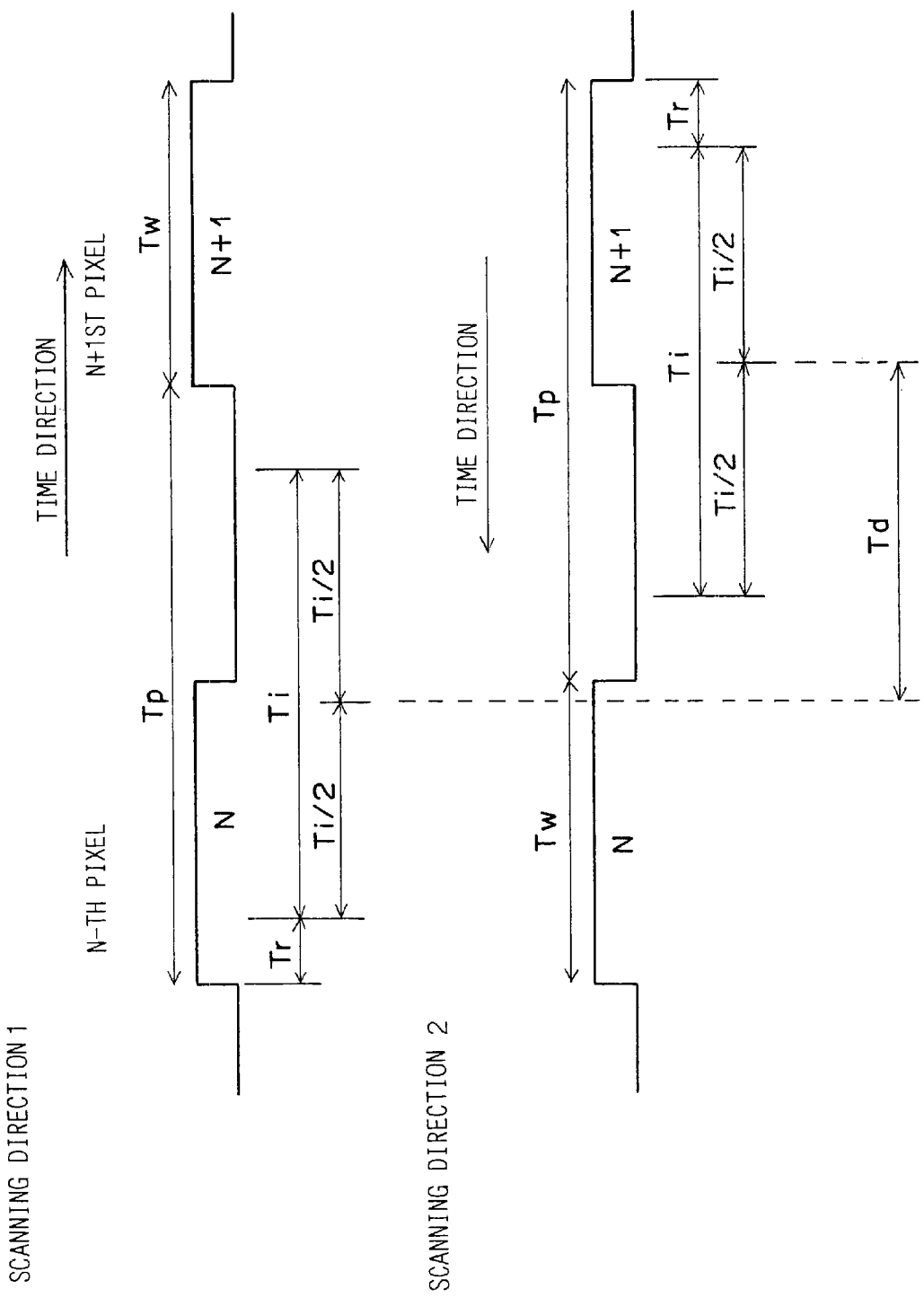
FIG. 2 is a view showing a time relation between a scanning position detecting clock and a timing pulse.
Figure 3:
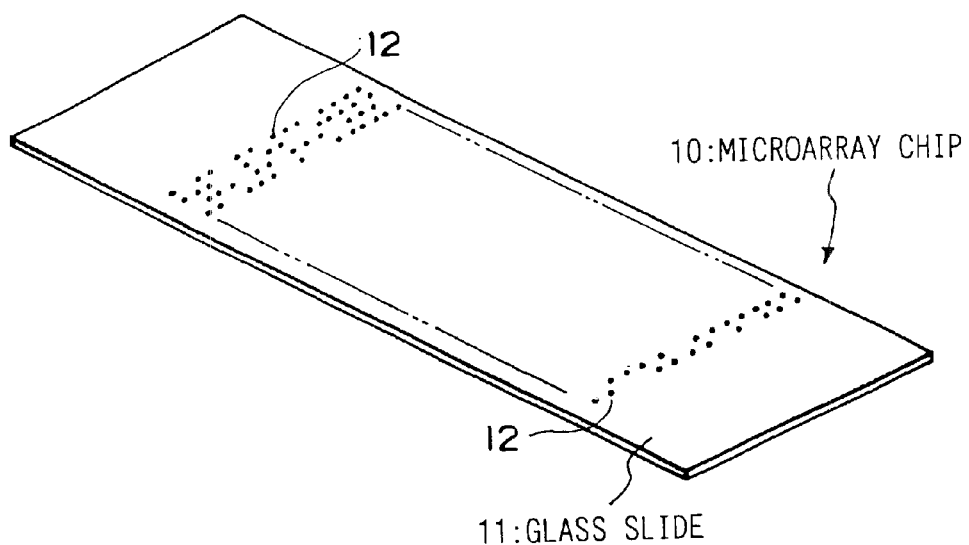
FIG. 3 is a view showing a hybridized microarray chip to be read by a reader shown in FIG. 1.

Next, the specific embodiment of the scanner apparatus of the invention will be described. FIG. 1 is a block diagram showing a scanner apparatus according to a first embodiment; FIG. 2 a view showing a time relation between a scanning position detecting clock and a timing pulse; FIG. 3 a view showing an example of a hybridized microarray chip 10 shown in FIG. 1 to be scanned by the scanner apparatus; and FIG. 4 a view showing an example of the microarray chip before hybridization.

A scanner apparatus 1 using the microarray chip as an image carrier shown in FIG. 1 specifically includes a stage moving unit 2, an optical system 3, and a signal processing unit 4.

Figure 4:
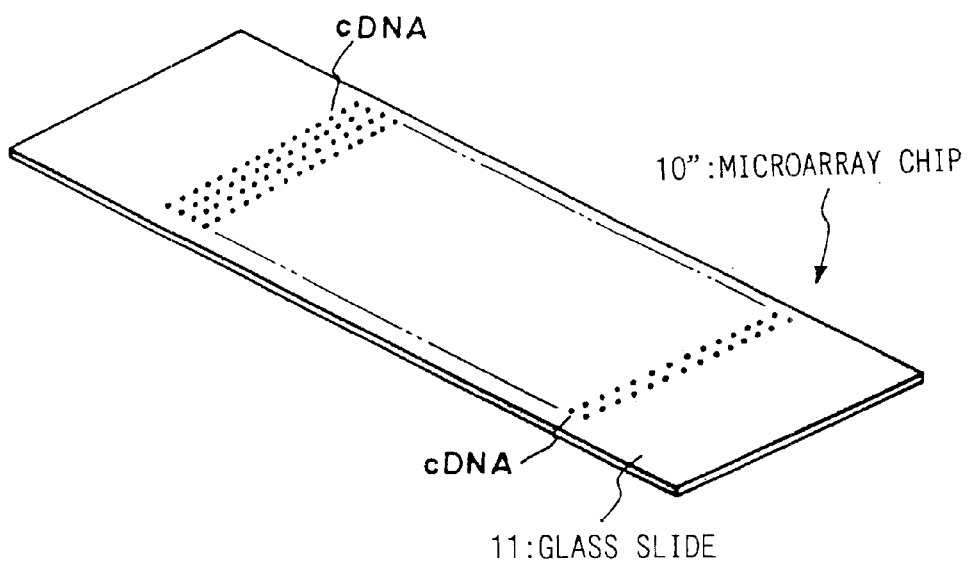
FIG. 4 is a view showing a state of the microarray chip of FIG. 3 before hybridization.

A microarray chip 10" shown in FIG. 4 includes cDNA different from each other, which are coated in preset positions in a highly dense matrix form on a glass slide 11. Each cDNA coated beforehand is known, and a correspondence between the coating position and the cDNA is apparent beforehand. DNA of a specimen having a hereditary disease is marked with a fluorescent dye and is hybridized in the microarray chip 10" shown in FIG. 4. A microarray chip 10 shown in FIG. 3 is one having only such a hybridized connected matter (matter to be detected) 12 left on the sliding glass 11. For the purpose of explanation, description is made such that the position of the remaining connected matter 12 can be identified with the naked eye by comparing the microarray chip 10" shown in FIG. 4 with the microarray chip 10 shown in FIG. 3. However, in an actual microarray chip, it is difficult to identify such a position with the naked eye because of the highly dense coating of the cDNA.

The microarray chip 10 is scanned by the excitation light L. When the connected matter 12 is present in a scanning position, the connected matter 12 is irradiated with the excitation light L. Accordingly, a fluorescent dye of the connected matter 12 is excited to emit fluorescence K. On the other hand, if there are no connected matters 12 in the scanning position irradiated with the exciting light L, no fluorescence K is emitted from the microarray chip 10.

The stage moving unit 2 includes: a two-dimensionally movable light transmissive stage 21, on which the microarray chip 10 shown in FIG. 2 is loaded; a first stepping motor 22 for moving the stage 21 in a Y axial direction and a second stepping motor 23 for moving the stage 21 in an X axial direction so as to scan the microarray chip 10 loaded on the stage 21 by the excitation light L; and a stepping motor control circuit 24 for driving the stepping motors 22 and 23. Thus, in the XY plane of FIG. 1, the excitation light L scans the microarray chip 10 at a predetermined speed.

The optical system 3 includes: an excitation light source 31 for emitting the excitation light L; a collimator lens 32 for converting the excitation light L emitted from the excitation light source 31 into parallel luminous fluxes; a polarized beam splitter 33 for transmitting the excitation light L and reflecting the fluorescence K; and a focusing lens 34 for converging the excitation light L transmitted through the polarized beam splitter 33 on the microarray chip 10 loaded on the stage 21 so as to have a predetermined size.

The signal processing unit 4 includes: a photomultiplier 40 having a photomultiplier function for photoelectrically detecting the fluorescence K emitted from the microarray chip 10; an integration circuit 50 as an I/V conversion circuit for converting a current signal outputted from the photomultiplier 40 into a voltage signal; an offset compensation circuit 60 for reducing (canceling) an offset voltage which may be generated due to charge injection in the integrating operation of the integration circuit 50; a logarithmic conversion circuit 70 for subjecting the voltage signal outputted from the integration circuit 50 to logarithmic conversion; an A/D conversion circuit 80 for converting an analog voltage signal subjected to logarithmic conversion and compressed by the logarithmic conversion circuit 70 into a digital voltage signal by a sampling frequency fs of about 10 to 1000 KHz; an operation mode setting circuit 90; an integration timing setting circuit 91; and other peripheral circuits.

In the signal processing unit 4, the scanning position of the exciting light L is correspondingly set by entering a scanning position detecting clock indicating the scanning position from the stepping motor control circuit 24. The integration timing setting circuit 91 generates a timing pulse indicating the timing and the period of resetting or measuring for the integration circuit 50 in connection with the signal entered from the stepping motor control circuit 24.

In this case, as the integration circuit, two systems, i.e., a high-speed integration circuit 50*a* and a low-speed integration circuit 50*b* are provided. However, since only one group is prepared for adjustment input, an arrangement must be made to enable each of the two integration circuits to be adjusted by this group. Each of the integration circuits 50*a* and 50*b* is constructed to be a DC direct connection type for directly integrating a photomultiplier output current so as not to degrade the S/N ratio. In addition, each of the integration circuits 50*a* and 50*b* is constructed such that an integration timing can be set by the integration timing setting circuit 91.

Next, peripheral circuits of the photomultiplier 40 will be described. Around the photomultiplier 40, as shown in FIG. 1, there are a resistance division type (bleeder circuit type) high-voltage circuit 41 provided to drive the photomultiplier 40, and an overcurrent protection circuit 42 provided to protect the photomultiplier 40 from an abnormal current.

A high voltage HV of about 900 V is applied from the high-voltage circuit 41 to the photomultiplier 40. The high voltage HV is applied through an LC circuit in order to cut the switching noise of a not-shown high-voltage power source (HV noise measure). In addition, in order to monitor a voltage in the last stage of a dynode of the photomultiplier 40, an arrangement is made to enable a circuit voltage in the last stage of the divided resistance of the high-voltage circuit 41 to be monitored.

The overcurrent protection circuit 42 is constructed in such a manner that by determining the photomultiplier 40 to be in an overcurrent state if either one of the outputs of the integration circuits 50*a* and 50*b* exceeds 5 V, a high voltage HV can be set to 0 V by an overcurrent detection output held in a not-shown flip-flop, and cleared by a reset signal (HV-RESET) after the removal of the cause of the overcurrent.

Noted that, as the overcurrent protection circuit 42 detects the outputs of the integration circuits 50*a* and 50*b*, overcurrent protection may not be set or an erroneous operation may occur depending on a resetting interval of the integration operation. To prevent such a situation, it is advised that by considering a resetting interval, overcurrent protection functions if there is a photomultiplier maximum output when detection is made at, for example, an interval of 100 μsec.

The photomultiplier 40 has relatively high sensitivity, but a large dark current because of thermal noise from the photoelectric surface or the dynode of the photomultiplier 40. Accordingly, to reduce such a dark current, a cooling unit 45 is provided to cool the photomultiplier 40, the cooling unit including a Peltier element 46 having the photomultiplier 40 loaded thereon, and a driving circuit 47 for driving the Peltier element. Note that the cooling unit is not limited to the one using a Peltier element, but various well-known cooling methods can be used, e.g., a heat sink. Thus, the possibility of dark current influence is reduced when very weak light is detected.

Next, an operation of the scanner apparatus 1 according to the present embodiment will be described.

First, the microarray chip 10 shown in FIG. 2 is loaded in a predetermined position on the stage 21. In this case, each predetermined position of the coated cDNA on the microarray chip 10 is set in a corresponding relation to the X and Y axial directions on the stage 21. This correspondence is entered from the stepping motor control circuit 24 to each of the stepping motors 22 and 23.

Meanwhile, the excitation light L is emitted from the excitation light source 31, and this excitation light L is made incident on the collimator lens 32, and converted into parallel luminous fluxes. The excitation light L converted into the parallel luminous fluxes is transmitted through the beam splitter 33, and then converged by the focusing lens 34 on the microarray chip 10 loaded on the stage 21.

Each of the stepping motors 22 and 23 drives the stage 21 in the XY plane and stops it in this position based on a scanning command entered from the stepping motor control circuit 24, in order to irradiate a predetermined scanning position on the microarray chip 10 with the excitation light L.

With the rising edge of each pulse of the scanning position detecting clock used as a reference, the integration timing setting circuit 91 generates a pulse indicating resetting for the period of time Tr from the rising edge, and a pulse indicating measuring for the period of time Ti after the passage of the time Tr from the rising edge. Based on the indications of these pulses, the integration circuit 50 repeats resetting and measuring.

In this case, to detect the n-th pixel from the left during the going scanning of the Y axial direction, the pulses of the resetting period Tr and the measuring period Ti are generated by using the pulse of the n-th scanning position detecting clock as a reference, and the integration circuit 50 is controlled.

If there is a connected matter 12 in the scanning position irradiated with the excitation light L, the connected matter 12 is irradiated with the excitation light L. The fluorescent dye of the connected matter 12 is thereby excited, emitting fluorescence K. On the other hand, if there are no connected matters 12 in the scanning position irradiated with the excitation light L, no fluorescence K is emitted from the microarray chip 10.

When the connected matter 12 is present, and the fluorescence K is emitted, the fluorescence K is successively passed through the focusing lens 34 and the polarized beam splitter 33, and made incident on the photomultiplier 40. Then, the fluorescence K is converted into a current signal according to the quantity of light, entered to the integration circuit 50 of the subsequent step to be converted into a voltage signal. The voltage signal is then subjected to logarithmic compression by the logarithmic conversion circuit 70, and converted by the A/D conversion circuit 80 into a digital signal by a scale factor suited to the width of signal amplitude.

After the passage of predetermined time from the irradiation of the first scanning position with the exciting light L, a next scanning position is entered from the stepping motor control circuit 24 to the stepping motors 22 and 23. Then, for example only the stepping motor 23 is driven to move the stage 21 in the X axial direction by a predetermined distance, and stops it after the movement to the next scanning position where it will be irradiated by the excitation light L. Subsequently, this next scanning position is irradiated with the excitation light L; if there is connected matter 12 as in the above-described case, the fluorescence K is emitted, and detected by the photomultiplier 40. If no connected matters 12 are present, no detection is carried out.

After scanning is completed up to the end of the microarray chip 10, the stage 21 is moved by the stepping motor 22 in the Y axial direction by a distance corresponding to one pixel, then again in the X axial direction, main scanning of a returning direction is carried out in a direction opposite the going direction.

During the scanning of the returning direction, as in the case of the going direction, by using the rising edge of each pulse of a scanning position detecting clock as a reference, the integration timing setting circuit 91 generates a pulse indicating resetting for the period of time Tr from the rising edge, and a pulse indicating measuring for the period of time Ti after the passage of time Tr from the rising edge. However, to detect the n-th pixel from the left in the returning direction, by using the n+1st pulse of the scanning position detecting clock from the left as a reference, a difference period Td generated between the going and returning directions, obtained by the foregoing principle, is delayed to generate a timing clock, and the integration circuit 50 is controlled thereby.

The foregoing process is repeated for the entire surface of the microarray chip 10. The signal indicating the scanning position has been entered from the stepping motor control circuit 24 to the signal processing unit 4, a correspondence is set among the scanning position of the exciting light L, the presence or absence of detected fluorescence K and the quantity of light, and an image is outputted based on the digital signal outputted from the A/D conversion circuit 80. As a result, functional analysis is performed for the DNA of the specimen having a hereditary disease based on the aforementioned correspondence.

The preferred embodiment of the scanner apparatus of the invention has been described. However, the invention is not limited to the embodiment and, for example, the scanning optical system may be moved while an object to be measured is fixed.

In addition, according to the embodiment, the scanner apparatus of the invention is constructed as a fluorescent scanner, which uses the microarray chip. However, there should be no limitation placed in this regard, and the invention can be applied to a scanner apparatus used for a fluorescence detecting system using one other than the microarray chip for genetic analysis such as gene expression analysis, base sequence determination, mutational analysis, polymorphous analysis, and so on.

Furthermore, the invention may be applied to a scanner apparatus used for autoradiography designed to display image data on a screen of a CRT or the like as an image, which is obtained by converting positional information of a radiation marked substance in a sample into an electric signal using, for example an stimulable phosphor sheet, autoradiography designed to analyze the positional information of a gene utilizing a hybridization method based on Southern blotting, autoradiography designed to separate and identify protein by polyacrylamide gel electrophoresis, or evaluate a molecular weight and a characteristic, a detecting system by an electron microscope, a radiation diffracted image detecting system or the like.

What is claimed is:

1. A scanner apparatus having a bidirectional scanning function capable of scanning in both going and returning directions, comprising:

an integration amplifying detector for accumulating a detected quantity of light in a measuring period Ti within one cycle Tp, and releasing the accumulated quantity of light in a resetting period Tr;

a scanning position detecting clock generator for generating a scanning position detecting clock of an interval equal to the cycle Tp for obtaining information by the integration amplifying detector;

a timing pulse generator for detecting the scanning position detecting clock, deciding the resetting period Tr and the measuring period Ti of the integration amplifying detector based on the scanning position detecting clock, and generating timing pulses indicating the resetting period Tr and the measuring period Ti; and an A/D converter for converting a value of the quantity of light accumulated in the integration amplifying detector into a digital value, wherein the timing pulse generator generates, in the returning direction, the timing pulses by delaying said timing pulses by a difference period Td generated between the going and returning directions.

2. The scanner apparatus according to claim 1, wherein the scanning position detecting clock generator changes the cycle Tp of the scanning position detecting clock according to a measuring condition.

3. The scanner apparatus according to claim 1, wherein the timing pulse generator generates the timing pulses to set a positive value for the difference period Td.

4. The scanner apparatus according to claim 1, wherein the timing pulse generator detects the scanning position detecting clock with a detection accuracy variance of 1% or lower.

5. The scanner apparatus according to claim 1, wherein the timing pulse generator generates the timing pulses to set the measuring period longer by four times or more than the resetting period.

6. The scanner apparatus according to claim 1, wherein when no scanning position detecting clock is detected in a cycle longer by 1.5 times than the cycle for obtaining the information, the timing pulse generator generates a timing pulse indicating the resetting period.

* * * * *